US009803407B2

(12) United States Patent
Seto et al.

(10) Patent No.: US 9,803,407 B2
(45) Date of Patent: Oct. 31, 2017

(54) DOOR OPENING AND CLOSING APPARATUS

(71) Applicant: MITSUI KINZOKU ACT CORPORATION, Kanagawa (JP)

(72) Inventors: Naoya Seto, Kanagawa (JP); Shuntaro Kimura, Kanagawa (JP); Naoki Hanaki, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 0 days.

(21) Appl. No.: 14/900,571

(22) PCT Filed: Sep. 24, 2014

(86) PCT No.: PCT/JP2014/075304
§ 371 (c)(1),
(2) Date: Dec. 21, 2015

(87) PCT Pub. No.: WO2016/021082
PCT Pub. Date: Feb. 11, 2016

(65) Prior Publication Data
US 2016/0201375 A1    Jul. 14, 2016

(30) Foreign Application Priority Data
Aug. 6, 2014    (JP) .................................. 2014-160789

(51) Int. Cl.
*E05F 11/00*       (2006.01)
*E05D 15/10*       (2006.01)
(Continued)

(52) U.S. Cl.
CPC .......... *E05D 15/1042* (2013.01); *B60J 5/047* (2013.01); *B60J 5/06* (2013.01); *E05F 11/54* (2013.01);
(Continued)

(58) Field of Classification Search
CPC .. E05D 15/1042; B60J 5/04; B60J 5/06; B60J 5/047; E05F 15/00; E05F 11/54
(Continued)

(56) References Cited

U.S. PATENT DOCUMENTS 4,862,640 A    9/1989  Boyko et al.
4,887,390 A   12/1989  Boyko et al.
(Continued)

FOREIGN PATENT DOCUMENTS

CN           1333142 A     1/2002
CN           1847598 A    10/2006
(Continued)

OTHER PUBLICATIONS

International Search Report dated Nov. 11, 2014, received in related International Application No. PCT/JP2014/075304, filed Sep. 24, 2014.
(Continued)

*Primary Examiner* — Jerry Redman
(74) *Attorney, Agent, or Firm* — McDermott Will & Emery LLP

(57) ABSTRACT

A door opening and closing apparatus includes a rail module including: a rail member extending along a front-and-rear direction; a drive device mounted on the rail member; and a supporting member coupled to one end portion of a closing cable the other end portion of which is connected to the drive device and one end portion of an opening cable the other end portion of which is connected to the drive device. The rail module is provided with the drive device fastened to an outside of a vehicle body such that a part of the drive device goes inside the vehicle body through an opening provided on the vehicle body. A portion of a housing of the drive device located outside the vehicle body closes the opening while a sealing member is interposed therein.

3 Claims, 15 Drawing Sheets

(51) Int. Cl.
*B60J 5/04* (2006.01)
*E05F 15/00* (2015.01)
*B60J 5/06* (2006.01)
*E05F 11/54* (2006.01)
*E05F 15/646* (2015.01)

(52) U.S. Cl.
CPC ............ *E05F 15/00* (2013.01); *E05F 15/646* (2015.01); *E05Y 2201/684* (2013.01); *E05Y 2600/56* (2013.01); *E05Y 2900/531* (2013.01)

(58) Field of Classification Search
USPC .......................................... 49/360; 296/155
See application file for complete search history.

(56) References Cited

U.S. PATENT DOCUMENTS

| | | | | |
|---|---|---|---|---|
| 5,168,666 | A * | 12/1992 | Koura | B60J 5/06 49/280 |
| 5,319,881 | A * | 6/1994 | Kuhlman | E05F 15/646 49/138 |
| 5,323,570 | A * | 6/1994 | Kuhlman | E05F 15/646 49/138 |
| 5,746,025 | A | 5/1998 | Shimura | |
| 5,832,668 | A | 11/1998 | Faubert et al. | |
| 6,152,519 | A * | 11/2000 | Blank | E05F 15/646 296/155 |
| 6,164,015 | A * | 12/2000 | Kawanobe | E05F 15/646 49/360 |
| 6,231,113 | B1 | 5/2001 | Armbruster et al. | |
| 6,321,489 | B1 * | 11/2001 | Murofushi | B60J 5/062 49/360 |
| 6,328,374 | B1 * | 12/2001 | Patel | B60J 5/06 296/155 |
| 6,425,206 | B1 | 7/2002 | Noda et al. | |
| 6,575,864 | B1 * | 6/2003 | Dean | E05F 15/638 475/5 |
| 7,325,361 | B2 * | 2/2008 | Rogers, Jr. | E05F 15/643 296/155 |
| 7,585,014 | B2 * | 9/2009 | Nishimura | B60J 5/06 296/146.4 |
| 7,648,194 | B2 * | 1/2010 | Hirasawa | B60N 2/01508 280/163 |
| 7,690,718 | B2 | 4/2010 | Blase | |
| 7,753,436 | B2 | 7/2010 | Kim et al. | |
| 7,841,609 | B2 * | 11/2010 | Okada | B60R 3/02 280/163 |
| 7,866,731 | B2 | 1/2011 | Oberheide et al. | |
| 7,934,737 | B2 * | 5/2011 | Okada | B60R 3/02 280/163 |
| 8,007,028 | B2 * | 8/2011 | Pencak | B60J 5/06 296/155 |
| 8,118,344 | B2 | 2/2012 | Takaya et al. | |
| 8,152,221 | B2 * | 4/2012 | Yoshioka | B60J 5/06 296/155 |
| 8,256,161 | B2 | 9/2012 | Nagai et al. | |
| 8,701,348 | B2 * | 4/2014 | Ito | E05D 15/0621 49/213 |
| 8,777,296 | B2 * | 7/2014 | Suzuki | B60R 3/00 280/163 |
| 9,033,397 | B2 * | 5/2015 | Sumiya | B60J 5/06 296/155 |
| 9,151,098 | B2 * | 10/2015 | Yamada | B60J 5/06 |
| 2002/0112404 | A1 | 8/2002 | Au Truong | |
| 2004/0216383 | A1 | 11/2004 | Rogers et al. | |
| 2004/0221511 | A1 | 11/2004 | Rogers et al. | |
| 2005/0062313 | A1 * | 3/2005 | Barczynski | B60J 5/062 296/155 |
| 2005/0110300 | A1 * | 5/2005 | Oxley | B60J 5/06 296/155 |
| 2006/0113821 | A1 * | 6/2006 | Yokomori | B60J 5/06 296/155 |
| 2006/0225358 | A1 | 10/2006 | Haag et al. | |
| 2007/0278822 | A1 * | 12/2007 | Mueller | B60J 5/06 296/155 |
| 2008/0000161 | A1 | 1/2008 | Nagai et al. | |
| 2008/0224438 | A1 * | 9/2008 | Okada | B60R 3/02 280/163 |
| 2008/0238019 | A1 * | 10/2008 | Okada | B61D 23/025 280/166 |
| 2008/0238020 | A1 * | 10/2008 | Okada | B60R 3/02 280/166 |
| 2009/0039673 | A1 * | 2/2009 | Fukumoto | E05F 5/003 296/155 |
| 2009/0113801 | A1 * | 5/2009 | Yokomori | E05F 15/646 49/352 |
| 2009/0133333 | A1 * | 5/2009 | Yokomori | B60J 5/06 49/360 |
| 2010/0043296 | A1 | 2/2010 | Oxley | |
| 2010/0199567 | A1 | 8/2010 | Ishida et al. | |
| 2011/0126466 | A1 | 6/2011 | Adachi et al. | |
| 2012/0292125 | A1 | 11/2012 | Kriese et al. | |
| 2014/0232132 | A1 * | 8/2014 | Kwon | B60J 5/06 296/155 |
| 2014/0237901 | A1 | 8/2014 | Kwon et al. | |
| 2015/0033503 | A1 | 2/2015 | Yamada et al. | |
| 2015/0251525 | A1 | 9/2015 | Atomura et al. | |
| 2016/0060942 | A1 | 3/2016 | Hansen | |
| 2016/0201374 | A1 | 7/2016 | Seto et al. | |
| 2016/0201375 | A1 | 7/2016 | Seto et al. | |
| 2016/0333626 | A1 | 11/2016 | Seto et al. | |

FOREIGN PATENT DOCUMENTS

| | | |
|---|---|---|
| CN | 101087089 A | 12/2007 |
| CN | 101795883 A | 8/2010 |
| CN | 201841918 U | 5/2011 |
| CN | 102080484 A | 6/2011 |
| CN | 105229251 A | 1/2016 |
| JP | 1317828 A | 12/1989 |
| JP | H11-245666 A | 9/1999 |
| JP | 2000-160934 A | 6/2000 |
| JP | 2007-223402 A | 9/2007 |
| JP | 2009-114773 A | 5/2009 |
| JP | 2009-127290 A | 6/2009 |
| WO | 2013/129206 A1 | 9/2013 |

OTHER PUBLICATIONS

Office Action dated Nov. 1, 2016, issued in related Chinese Patent Application 201480042442.0, with English language translation.
Office Action issued in corresponding Chinese Patent Application No. 201480034541.4,28, dated Dec. 28, 2016.
International Search Report issued in corresponding International Patent Application No. PCT/JP2014/075303, dated Nov. 11, 2014.
International Search Report with Written Opinion dated Nov. 11, 2014, received in related International Patent Application No. PCT/JP2014/075279, dated Sep. 24, 2014.
Office Action issued in corresponding U.S. Appl. No. 14/900,538, dated Nov. 2, 2016.
Final Office Action issued in corresponding U.S. Appl. No. 14/900,538, dated May 18, 2017.
Office Action issued in corresponding U.S. Appl. No. 14/777,734, dated Jun. 2, 2017.
Office Action issued in corresponding U.S. Appl. No. 14/777,734 dated Aug. 12, 2016.
Final Office Action issued in corresponding U.S. Appl. No. 14/777,734, dated Feb. 23, 2017.

* cited by examiner

DOOR OPENING AND CLOSING APPARATUS

CROSS-REFERENCE

This application is the U.S. National Phase under 35 U.S.C. §371 of International Application No. PCT/JP2014/075304, filed Sep. 24, 2014, which claims the benefit of Japanese Application No. 2014-160789, filed Aug. 6, 2014, the entire contents of each are hereby incorporated by reference.

FIELD

The present invention relates to a door opening and closing apparatus, and more particularly, to a door opening and closing apparatus that moves a door to open and close.

BACKGROUND

As a door opening and closing apparatus that moves a door to open and close with respect to a vehicle body, one that has a rail module is conventionally known. The rail module includes a guide rail, a drive device, and a supporting member.

The guide rail extends along the front-and-rear direction and its front end portion is curved. The drive device is mounted on one side portion of the guide rail via a bracket. The drive device includes a motor that is a driving source and a rotating drum that is rotatable forward and backward by the drive of the motor. On the rotating drum, an opening cable and a closing cable are wound around after the respective one end portions thereof are connected. The rotating drum, when rotating in one direction, takes up the closing cable while letting out the opening cable. Meanwhile, when rotating in the other direction, the rotating drum takes up the opening cable while letting out the closing cable.

The opening cable is hung on a first pulley arranged at a lower portion of the front end portion of the guide rail, and the closing cable is hung on a second pulley arranged at a lower portion of the rear end portion of the guide rail.

The supporting member is coupled to the other end portions of the opening cable and the closing cable. That is, the supporting member is coupled to the other end portion of the opening cable hung on the first pulley, and is coupled to the other end portion of the closing cable hung on the second pulley. The supporting member is movable along the extending direction of the guide rail by a driving force given by the drive device.

In such a door opening and closing apparatus, by making the supporting member support a door after mounting the rail module on a vehicle body and by making the supporting member move, the door can be moved to open and close with respect to the vehicle body (see Patent Literature 1, for example).

CITATION LIST

Patent Literature

Patent Literature 1: Japanese Patent Application Laid-open No. 2009-127290

SUMMARY

Technical Problem

Although not explicitly described concerning the door opening and closing apparatus disclosed in the above-described Patent Literature 1, there has been a problem in that, when the rail module is mounted on the vehicle body such that a part of the drive device goes inside the vehicle body through an opening of the vehicle body, the water-tightness of the opening must be ensured.

In view of the above-described situation, an object of the present invention is to provide a door opening and closing apparatus that can make the installation work to a vehicle body easy and yield good water-tightness.

Solution to Problem

To achieve the above-described object, a door opening and closing apparatus according to the present invention includes a rail module including: a rail member extending along a front-and-rear direction; a drive device mounted on the rail member; and a supporting member coupled to: one end portion of a closing cable, the other end portion of which is connected to the drive device and, the closing cable being hung on a closing inversion member provided on one end portion of the rail member; and one end portion of an opening cable, the other end portion of which is connected to the drive device, the opening cable being hung on an opening inversion member provided on the other end portion of the rail member so that the supporting member is movable along an extending direction of the rail member by a driving force given by the drive device, the door opening and closing apparatus moving a door to open and close with movement of the supporting member by making the supporting member support the door. The rail module is provided with the drive device fastened to an outside of a vehicle body such that a part of the drive device goes inside the vehicle body through an opening provided on the vehicle body. A portion of a housing of the drive device located outside the vehicle body is pressed onto the vehicle body by the rail member and is fastened in a state of being pressed onto the vehicle body via a fastening member so as to close the opening while a sealing member is interposed therein.

In the door opening and closing apparatus according to the present invention, a supporting bracket that supports a drive unit of the drive device is fastened to the vehicle body with the fastening member.

Advantageous Effects of Invention

In accordance with the present invention, because the rail module is provided with the drive device fastened to the outside of a vehicle body such that a part of the drive device goes inside the vehicle body through an opening provided on the vehicle body, the installation work to the vehicle body can be made easy. Furthermore, a portion of the housing of the drive device located outside the vehicle body is pressed onto the vehicle body by the rail member and is fastened in a state of being pressed onto the vehicle body via the fastening member so as to close the opening while the sealing member is interposed therein. Consequently, the invention has an effect in that the opening can be closed while the number of fastening members is reduced and that better water-tightness can be yielded.

DESCRIPTION OF EMBODIMENT

With reference to the accompanying drawings, the following describes in detail an exemplary preferred embodiment of a door opening and closing apparatus according to the present invention.

Figure 1:
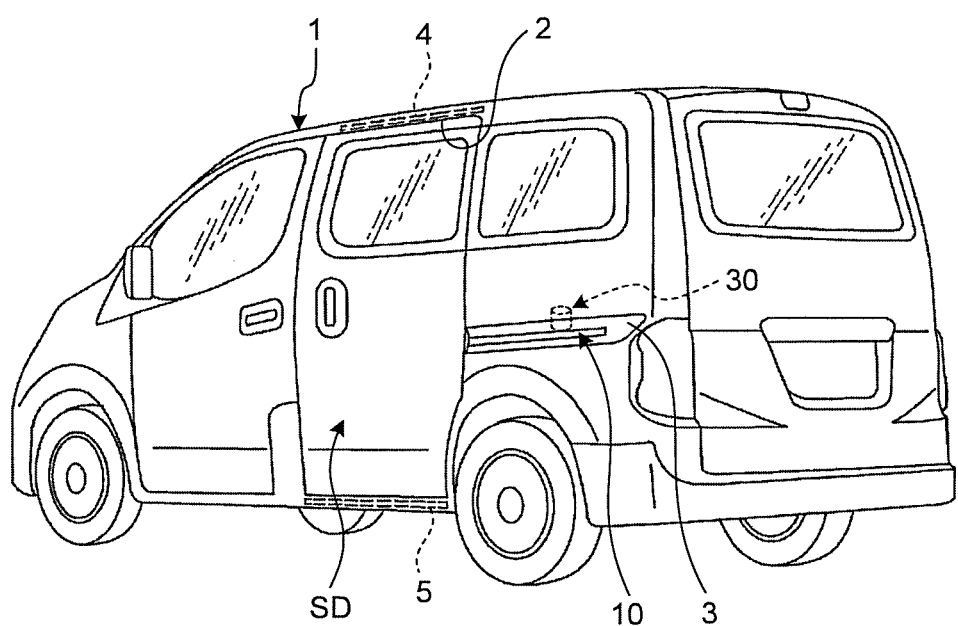
FIG. 1 is a perspective view, viewed obliquely from the rear left, of a vehicle to which a door opening and closing apparatus according to an embodiment of the present invention has been applied.

FIG. 1 is a perspective view, viewed obliquely from the rear left, of a vehicle to which the door opening and closing apparatus according to the embodiment of the invention has been applied. The door opening and closing apparatus exemplified here is one that is mounted on the rear side of entrances 2 formed on a vehicle body 1 at a medium-height level of the vehicle body 1, and includes two pieces of rail modules, for example. Of these rail modules, one is mounted on the left side of the vehicle body 1 on the rear side of the entrance 2 and the other is mounted on the right side of the vehicle body 1 on the rear side of the entrance 2.

In the following description, the rail modules that constitute the door opening and closing apparatus will be described. However, the rail module mounted on the right side of the vehicle body 1 on the rear side of the entrance 2 (hereinafter, also referred to as a right-side rail module) differs only in left-right orientation from a rail module 10 mounted on the left side of the vehicle body 1 on the rear side of the entrance 2 (hereinafter, also referred to as a left-side rail module). Thus, the following describes only the left-side rail module 10, and the description on the right-side rail module is omitted.

Figure 2:
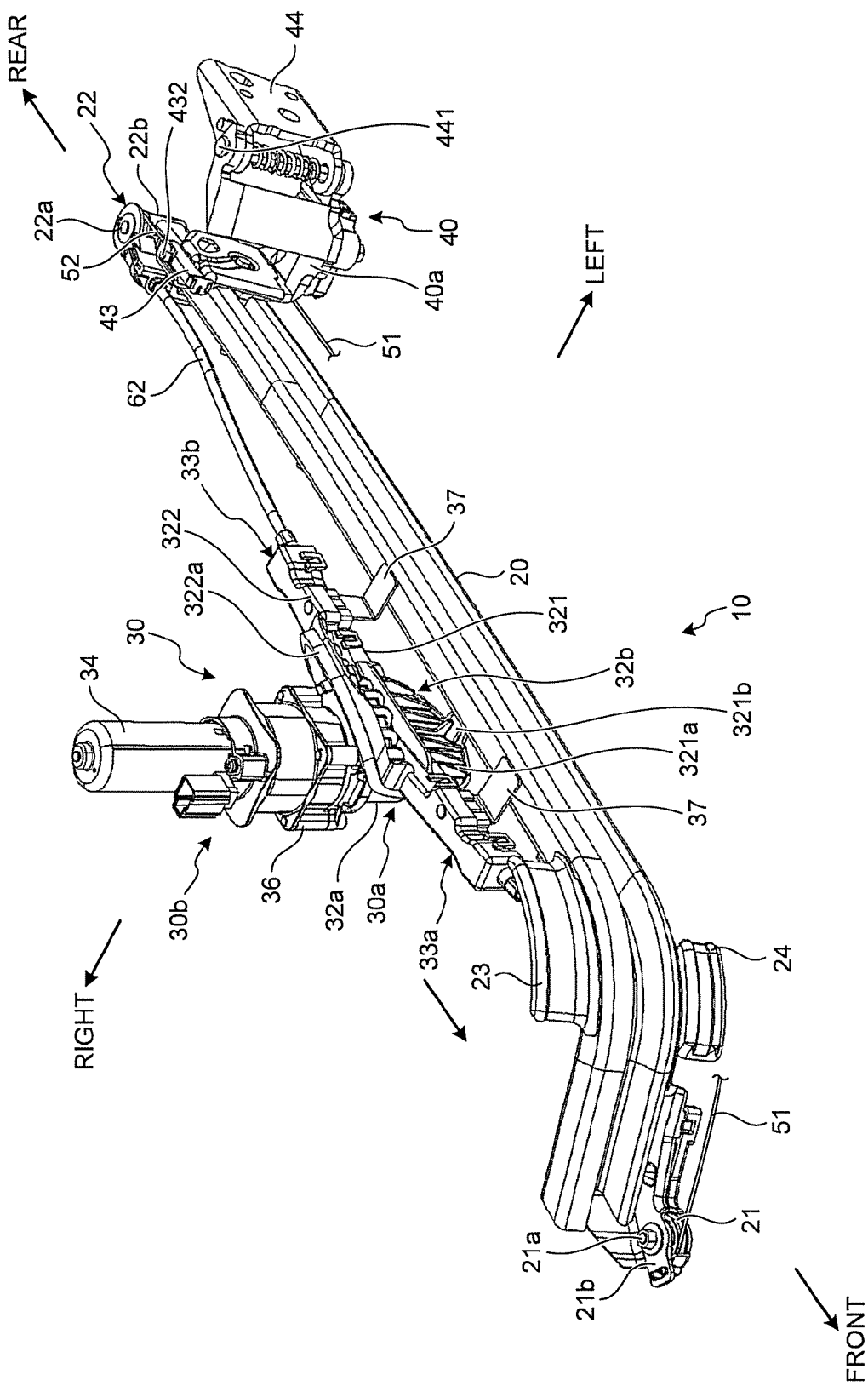
FIG. 2 is a perspective view of a left-side rail module constituting the door opening and closing apparatus illustrated in FIG. 1 viewed from the front left side.
Figure 3:
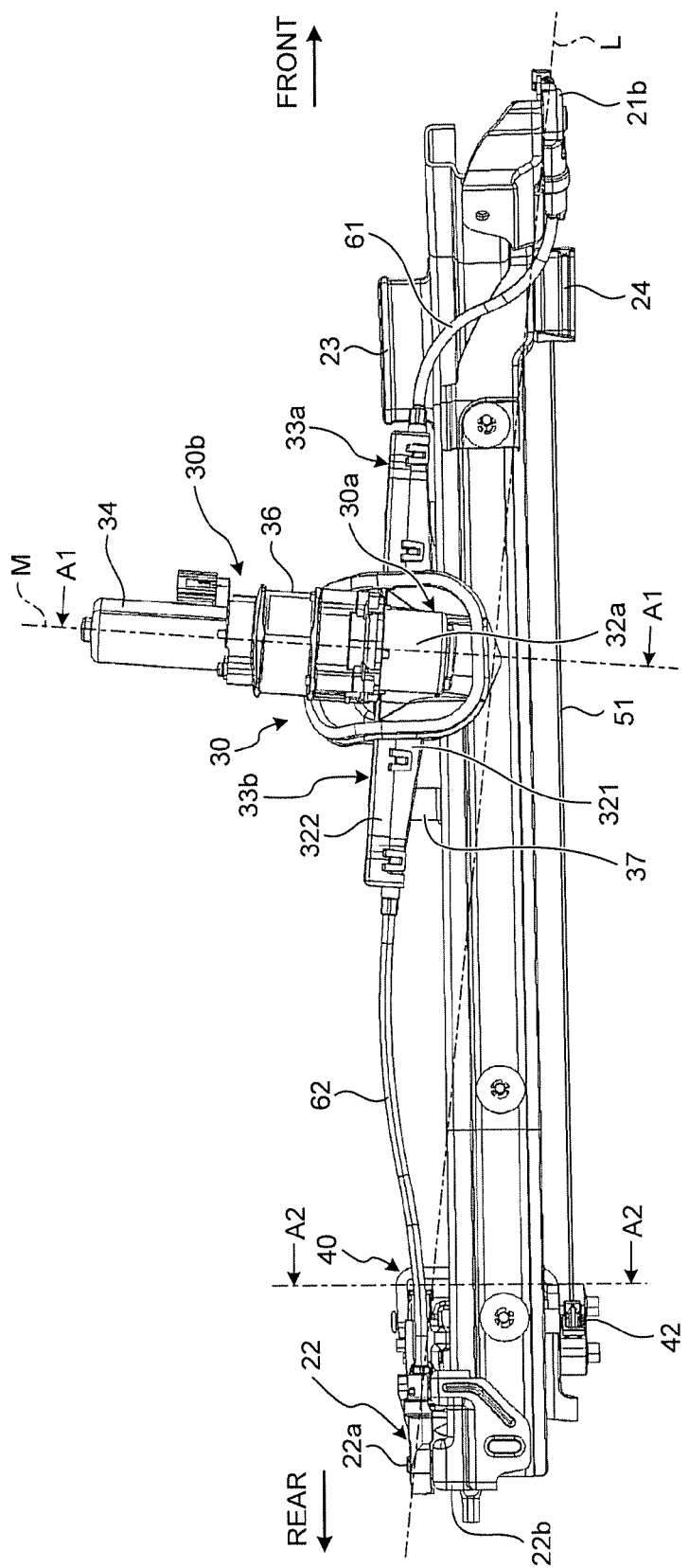
FIG. 3 is a right side view of the left-side rail module constituting the door opening and closing apparatus illustrated in FIG. 1 viewed from the right.

FIG. 2 is a perspective view of the left-side rail module 10 constituting the door opening and closing apparatus illustrated in FIG. 1 viewed from the front left side, and FIG. 3 is a right side view of the left-side rail module 10 constituting the door opening and closing apparatus illustrated in FIG. 1 viewed from the right. The left-side rail module 10 exemplified here includes a guide rail (rail member) 20, a drive device 30, and a supporting member 40.

The guide rail 20 is formed of a steel plate, for example, and is in a channel shape in longitudinal cross-section. The guide rail 20 is an elongate member for which the front-and-rear direction is the longitudinal direction, and its front side is curved halfway toward the right side. On such a guide rail 20, a first pulley (closing inversion member) 21, a second pulley (opening inversion member) 22, an upper guide plate 23, and a lower guide plate 24 are arranged.

The first pulley 21 is in a form of being rotatable around the shaft center of a shaft 21a extending along the up-and-down direction, and is arranged at a lower portion of the front end portion of the guide rail 20 via a first pulley bracket 21b. The first pulley bracket 21b is attached to the guide rail 20 by welding, for example.

Figure 4:
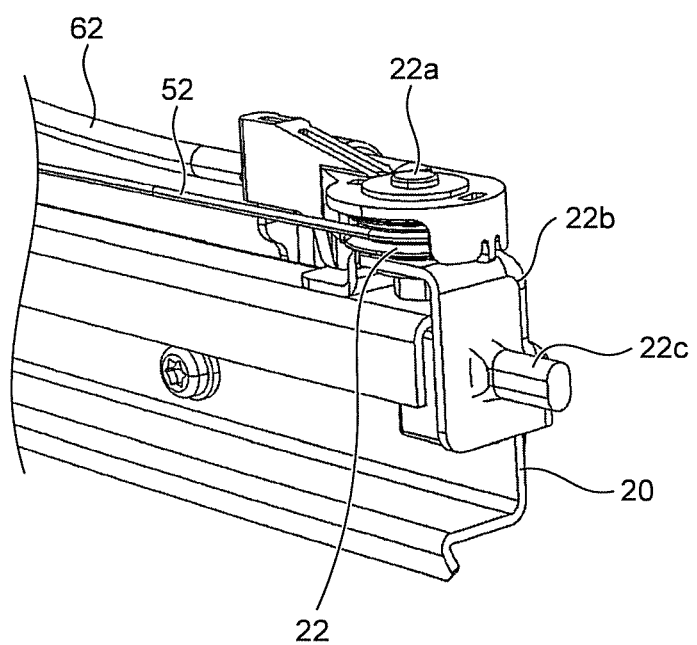
FIG. 4 is an enlarged perspective view illustrating a rear end portion of a guide rail.

The second pulley 22 is in a form of being rotatable around the shaft center of a shaft 22a extending along the up-and-down direction, and is arranged at an upper portion of the rear end portion of the guide rail 20 via a second pulley bracket 22b. The second pulley bracket 22b is attached to the guide rail 20 by welding, for example. On the second pulley bracket 22b, as illustrated in FIG. 4, a projection 22c that closes the upper portion of the rear end portion of the guide rail 20 and is projecting toward the rear side is formed.

The upper guide plate 23 is in a curved shape in transverse cross-section. The upper guide plate 23 is arranged on the guide rail 20 in a form of being projecting upward at a curved portion of the guide rail 20, that is, a portion curved to the right side halfway toward the front from the rear.

The lower guide plate 24 is in a curved shape in transverse cross-section. The lower guide plate 24 is arranged on the guide rail 20 in a form of being projecting downward at the curved portion of the guide rail 20.

The drive device 30 includes a driven unit 30a and a driving unit (drive unit) 30b. The driven unit 30a houses a rotating drum 31 (see FIG. 5) inside a casing 32. The rotating drum 31 is in a cylindrical form and is arranged to be rotatable forward and backward around the central axis of the rotating drum 31 itself. The rotating drum 31 is connected, on the outer circumferential surface thereof, to one end portions of a closing cable 51 and an opening cable 52 and winds the closing cable 51 and the opening cable 52. Explaining more specifically, the rotating drum 31 takes up the closing cable 51 and lets out the opening cable 52 when rotating in one direction while the rotating drum 31 takes up the opening cable 52 and lets out the closing cable 51 when rotating in the other direction.

The casing 32 constituting the driven unit 30a includes a casing body portion 32a and a casing outlet portion 32b. The casing body portion 32a is a portion that houses the above-described rotating drum 31 to be rotatable forward and backward.

The casing outlet portion 32b and the casing body portion 32a are communicating with each other inside, and the casing outlet portion 32b is constructed by fitting a cover drum 322 into a case drum 321. On the case drum 321, a tongue-shaped first closing plate portion 321a projecting downward is formed at the central portion, and on the first closing plate portion 321a, a projecting portion 321b projecting toward the right is formed.

On the cover drum 322 that fits in the case drum 321, a tongue-shaped second closing plate portion 322a extending toward the upper left side after extending upward is formed at the central portion. The second closing plate portion 322a, together with the first closing plate portion 321a, constitutes a closing portion to close a later-described opening P1 of the vehicle body 1.

The casing outlet portion 32b composed of the case drum 321 and the cover drum 322 being fitted includes a first arm portion 33a extending toward the front and a second arm portion 33b extending toward the rear.

A first outlet not depicted is formed on the front end surface of the first arm portion 33a, and on the front end surface, a closing outer tube 61 that couples the first outlet to the lower portion of the front end portion of the guide rail 20 is provided. The closing outer tube 61 extends toward the right side of the guide rail 20. A second outlet not depicted is formed on the rear end surface, and on the rear end surface of the second arm portion 33b, an opening outer tube 62 that couples the second outlet to the upper portion of the rear end portion of the guide rail 20 is provided.

The driving unit 30b includes a motor 34 and a deceleration mechanism 35, and the deceleration mechanism 35 is arranged at the upper portion of the casing body portion 32a in a state that it can be linked to the rotating drum 31. The motor 34 is a driving source and is rotatable forward and backward. The motor 34 is provided such that its rotating shaft is on the same axis as the rotating shaft of the rotating drum 31.

Figure 5:
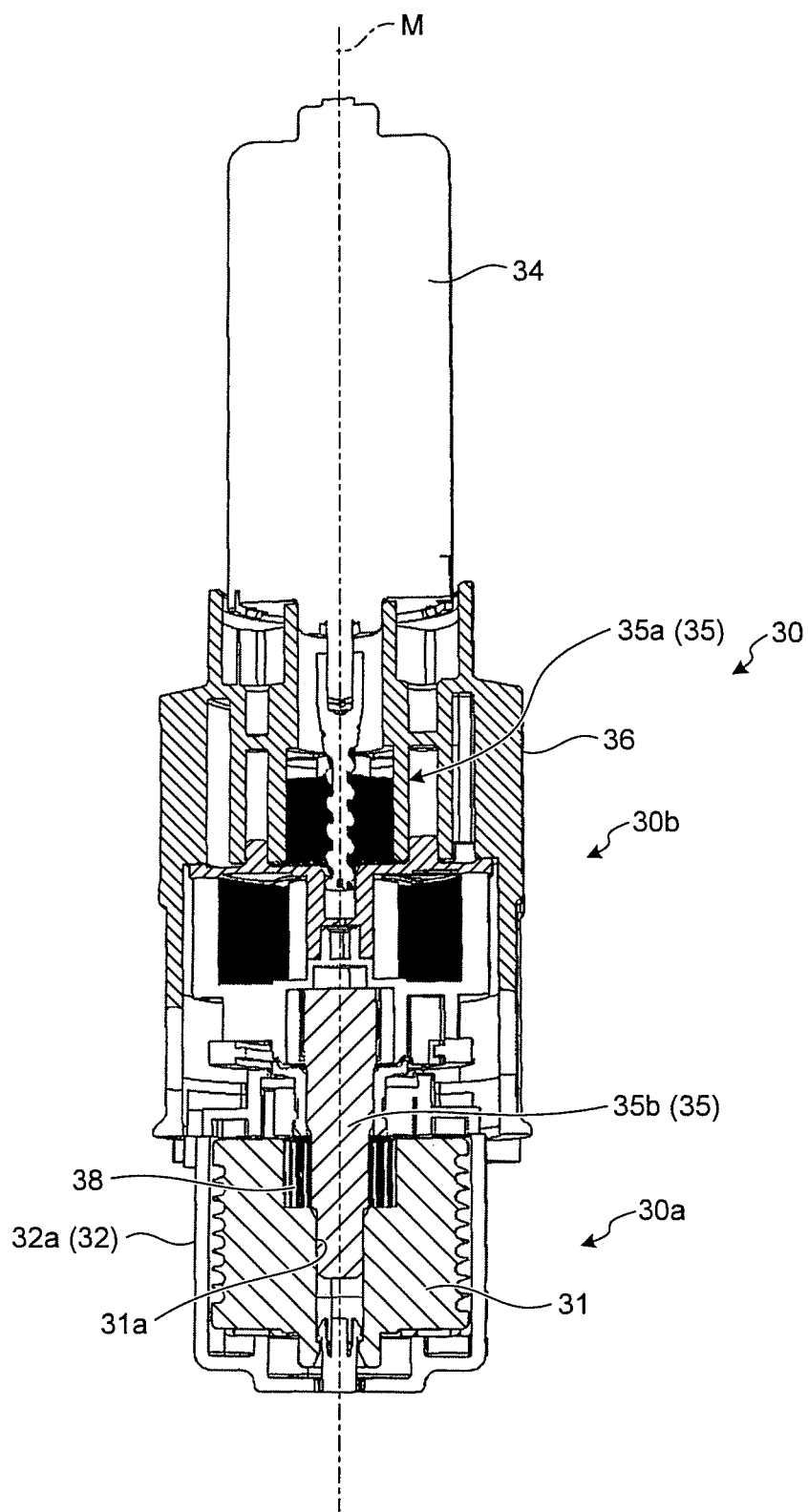
FIG. 5 is a longitudinal cross-sectional view, taken on line A1-A1 of FIG. 3, of a relevant portion of a drive device.

As illustrated in FIG. 5, the deceleration mechanism 35 is housed within a drive case 36. The drive case 36, together with the casing 32 of the driven unit 30a, constitutes the housing of the drive device 30. Such a deceleration mechanism 35 includes a reduction gear portion 35a that is composed of planetary gears and the like to decelerate the rotation of the motor 34 and an output shaft 35b that outputs the decelerated rotation by the reduction gear portion 35a. The output shaft 35b is projecting downward, inserted into a hollow portion 31a of the rotating drum 31, and linked to the rotating drum 31 via an adaptor 38.

Such a drive device 30, as illustrated in FIGS. 2 and 3, is arranged on the guide rail 20 by being supported by a plurality of drive brackets 37 that are arranged on the upper portion of the guide rail 20 by welding and the like and inserted to insertion portions (not depicted) formed on the casing outlet portion 32b.

Furthermore, the drive device 30 is arranged being inclined along a straight line L connecting the first pulley 21 and the second pulley 22 on the guide rail 20, and more specifically, is arranged on the guide rail 20 such that a rotation axis line M of the rotating drum extends substantially orthogonal to the straight line L and is slightly inclined toward the right. In the above-described drive device 30, the outer diameter of the rotating drum 31 is made smaller than a maximum diameter of the deceleration mechanism 35.

Figure 6A:
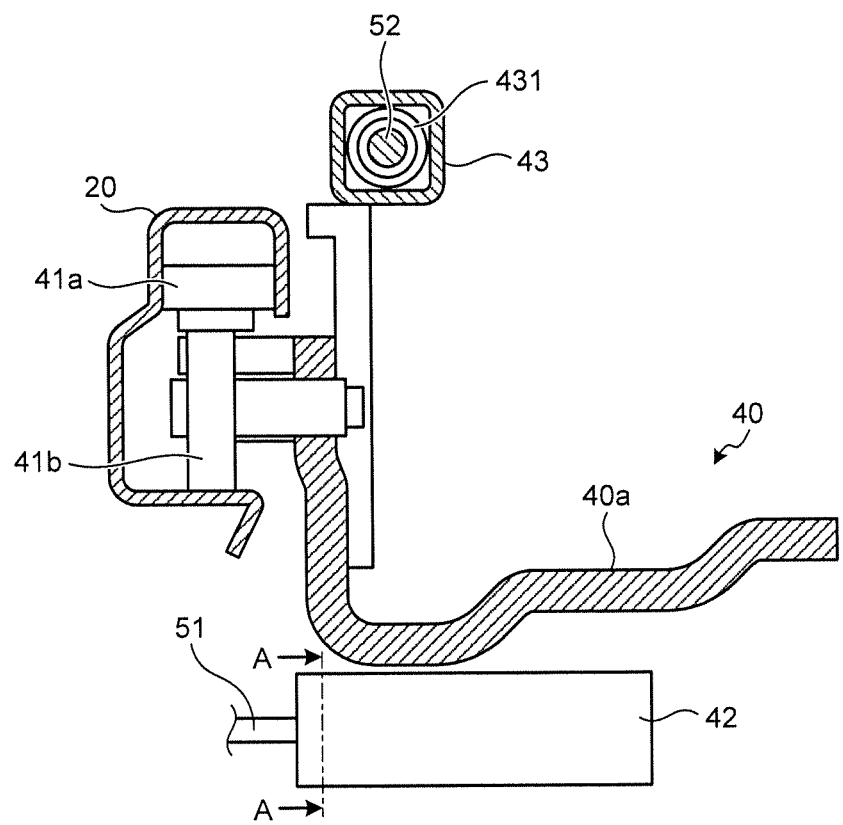
FIG. 6 are diagrams schematically illustrating a supporting member, FIG. 6A being a longitudinal cross-sectional view taken on line A2-A2 of FIG. 3, and FIG. 6B being a cross-sectional view viewed along the line A-A.

The supporting member 40, as illustrated in FIG. 6A, includes a support base portion 40a including a roller 41a that is rotatable around the vertical axis and a roller 41b that is rotatable around the horizontal axis, and is movable along the extending direction of the guide rail 20 by the rollers 41a and 41b rolling along the inside of the guide rail 20. Such a supporting member 40 is provided with a closing coupling portion 42, an opening coupling portion 43, and a mounting member 44, other than the above-described rollers 41a and 41b, on the support base portion 40a.

Figure 6B:
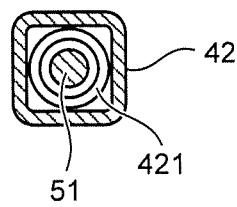

The closing coupling portion 42 is in a cylindrical shape provided at the lower portion of the supporting member 40. The closing coupling portion 42 is coupled to the other end portion of the closing cable 51 that is let out from the first outlet of the first arm portion 33a, inserted into the closing outer tube 61, and hung on the first pulley 21. In the closing coupling portion 42, as illustrated in FIG. 6B, a tensioner 421 composed of a coil spring that gives a tensile force to the closing cable 51 to absorb the looseness of the closing cable 51 is built in.

The opening coupling portion 43 is in a cylindrical shape provided at the upper portion of the supporting member 40. The opening coupling portion 43 is coupled to the other end portion of the opening cable 52 that is let out from the second outlet of the second arm portion 33b, inserted into the opening outer tube 62, and hung on the second pulley 22. In the opening coupling portion 43, a tensioner 431 composed of a coil spring that gives a tensile force to the opening cable 52 to absorb the looseness of the opening cable 52 is built in.

Furthermore, the opening coupling portion 43 is arranged on the supporting member 40 in a form of being able to swing about the shaft center of a shaft 432 extending along the up-and-down direction.

The mounting member 44 is arranged on the supporting member 40 to be rotatable about the shaft center of a shaft 441 extending along the up-and-down direction, and is the one that a later described slide door SD is mounted thereon.

The left-side rail module 10 thus configured is arranged on the vehicle body 1 in the following manner.

Figure 7:
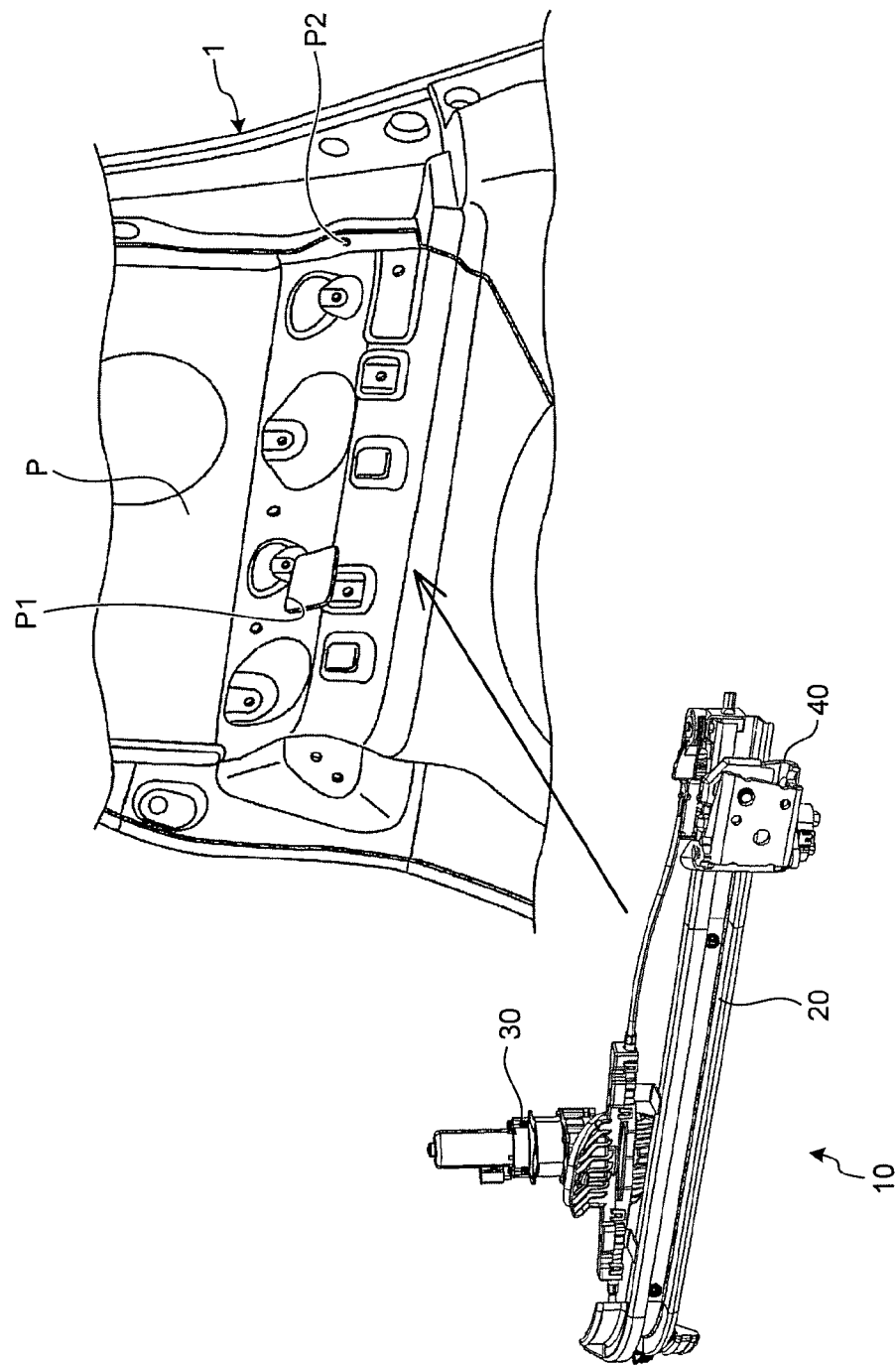
FIG. 7 is an explanatory diagram illustrating a state of mounting the left-side rail module onto the vehicle body.

That is, as schematically illustrated in FIG. 7, the left-side rail module 10 is brought close to a mounting panel P of the vehicle body 1, and the driving unit 30b of the drive device 30 and the casing body portion 32a of the driven unit 30a are inserted into the opening P1 formed on the mounting panel P and are made to go inside the vehicle body 1 (inside the mounting panel P). Subsequently, the projection 22c of the second pulley bracket 22b is inserted into a hole P2 formed on the rear of the mounting panel P, and the guide rail 20 is fastened with bolts and the like to a certain portion of the mounting panel P.

Figure 8:
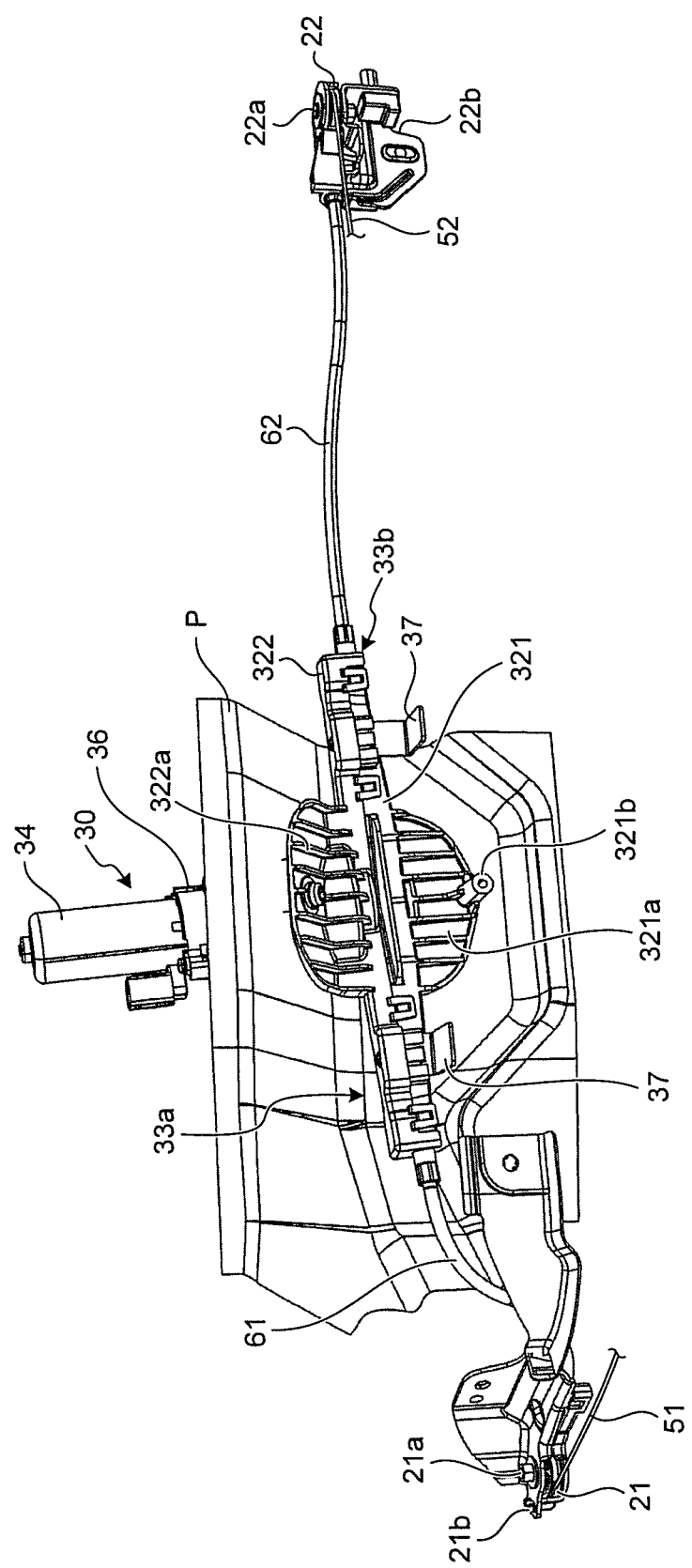
FIG. 8 is a perspective view illustrating a relevant portion of the left-side rail module mounted on the vehicle body.
Figure 9:
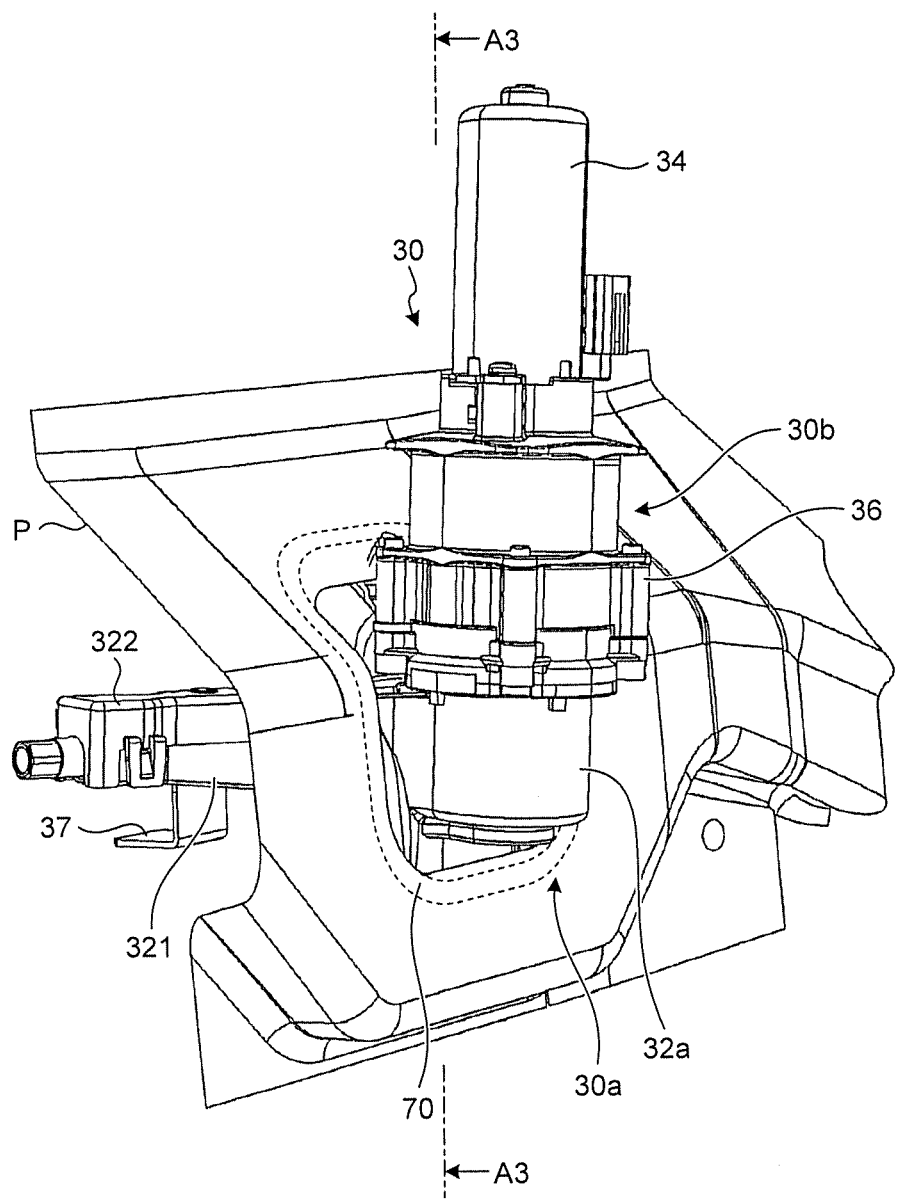
FIG. 9 is a perspective view illustrating a relevant portion of the left-side rail module mounted on the vehicle body.

In this case, as illustrated in FIGS. 8 and 9, the closing portion (the first closing plate portion 321a and the second closing plate portion 322a) that is the casing outlet portion 32b of the drive device 30 closes the opening P1 via a sealing member 70 in the following manner.

Figure 10:
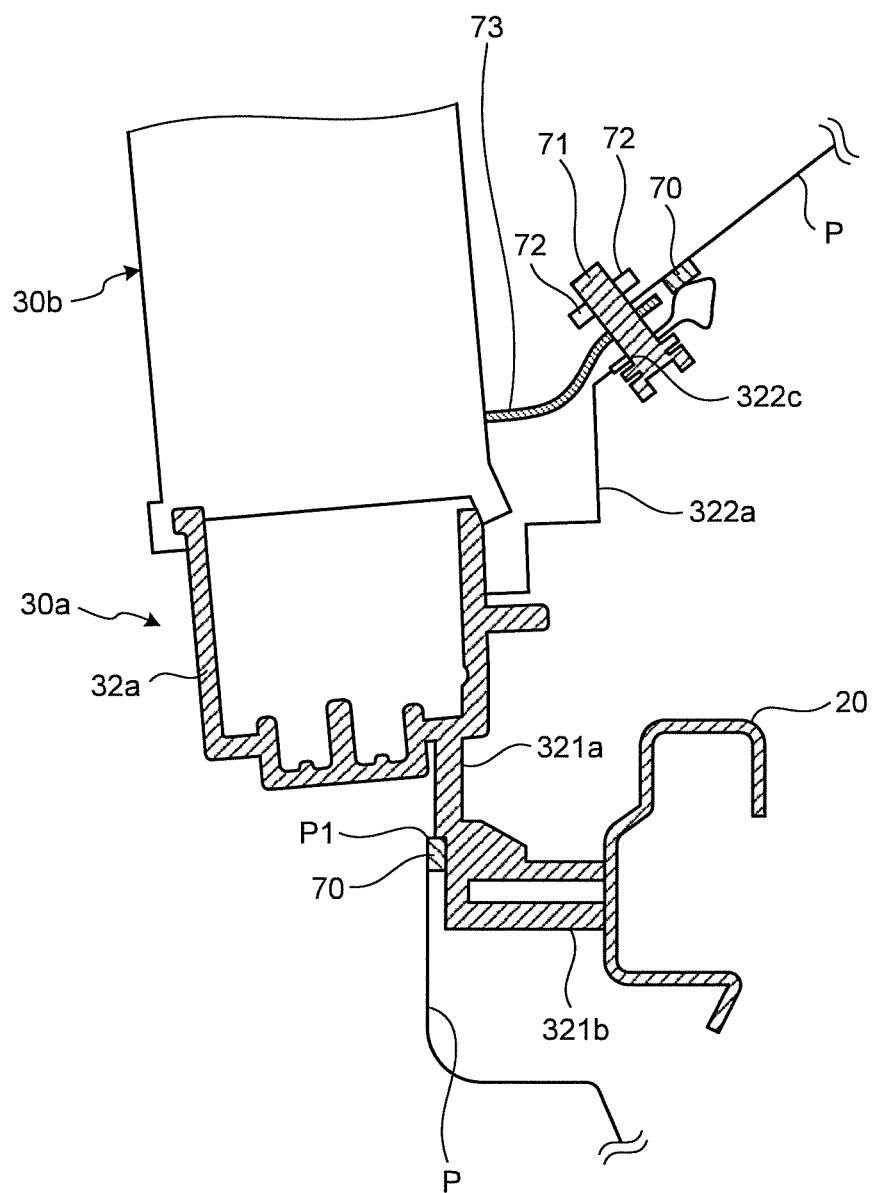
FIG. 10 is a cross-sectional view, taken on line A3-A3 of FIG. 9, schematically illustrating a state of closing an opening of the vehicle body.

By the projecting portion 321b of the case drum 321 constituting the casing outlet portion 32b being pressed onto the guide rail 20, the closing portion including the second closing plate portion 322a is pressed onto the mounting panel P (the vehicle body 1) in a state of the sealing member 70 being interposed. Then, as illustrated in FIG. 10, a fastening bolt (fastening member) 71 is inserted into a mounting hole 322c formed on the second closing plate portion 322a and is screwed to a fastening nut 72 provided on the mounting panel P. At this time, after inserting the fastening bolt 71 through a through-hole (not depicted) of a supporting bracket 73 that is to support the driving unit 30b of the drive device 30, the fastening bolt 71 and the fastening nut 72 are screwed and fastened together with the supporting bracket 73. In this manner, the opening P1 is closed by the closing portion and the left-side rail module 10 is arranged on the vehicle body 1.

After the left-side rail module 10 is arranged on the vehicle body 1 in this manner, as illustrated in FIG. 1, the upper portion of the guide rail 20 is covered with a cover member 3, what is called a finisher cover. Then, an upper supporting portion and a lower supporting portion, not depicted, mounted on the slide door SD are inserted into an upper rail 4 and a lower rail 5, respectively, of the vehicle body 1, and the slide door SD is mounted on the mounting member 44 afterward. This makes the left-side rail module 10 support the slide door SD.

Figure 11:
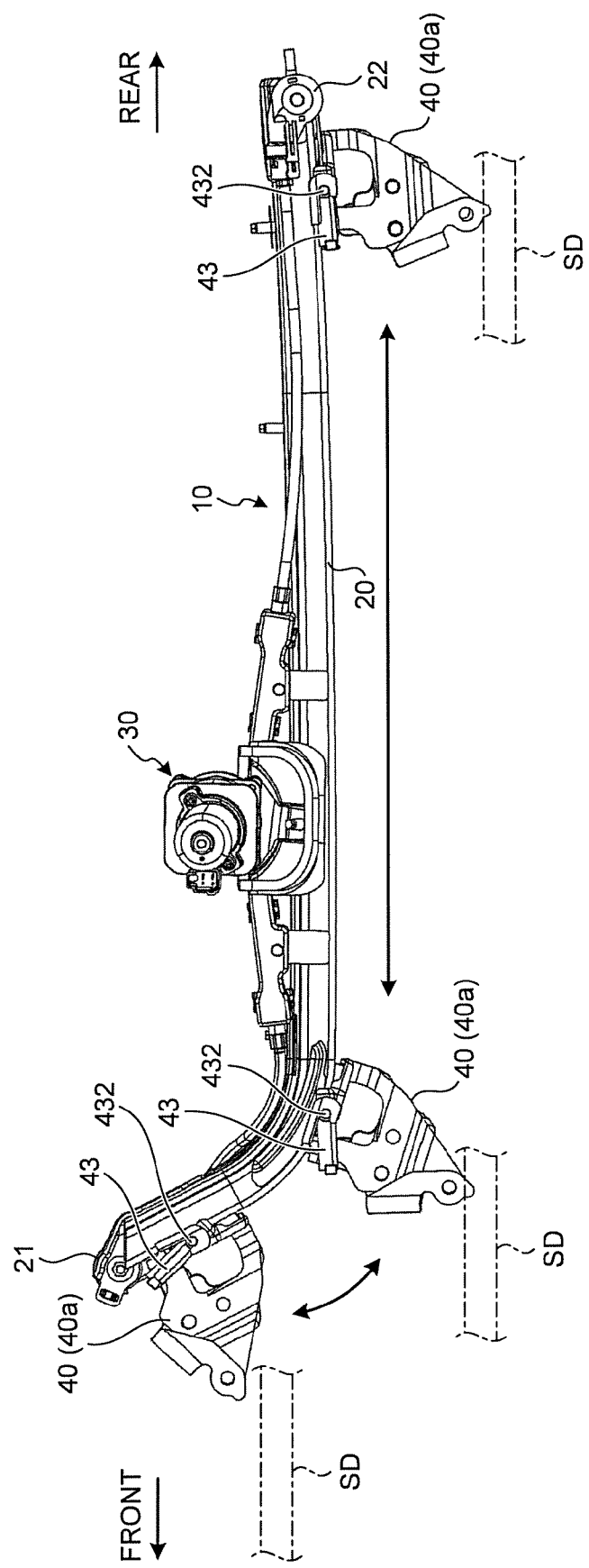
FIG. 11 is a diagram for explaining an opening and closing move of a slide door.

In the door opening and closing apparatus including such a left-side rail module 10, when the motor 34 of the drive device 30 rotates forward, its torque is transmitted to the rotating drum 31 through the deceleration mechanism 35 and the rotating drum 31 rotates in one direction. When the rotating drum 31 rotates in the one direction, the rotating drum 31 takes up the closing cable 51 and lets out the opening cable 52. Consequently, as illustrated in FIG. 11, the supporting member 40 moves toward the front, and thus the slide door SD moves to close.

In this case, the closing cable 51 moves along the lower surface of the guide rail 20, and at the curved portion of the guide rail 20, is guided by the lower guide plate 24. The opening cable 52 moves along the upper surface of the guide rail 20, and at the curved portion of the guide rail 20, is guided by the upper guide plate 23.

Then, when the supporting member 40 moving toward the front reaches the front end portion of the guide rail 20, the slide door SD closes the entrance 2. When the slide door SD closes the entrance 2 in this manner, a part of the guide rail 20 is in a state of being exposed. However, because the closing cable 51 that moves along the lower surface of the guide rail 20 has been taken up by the rotating drum 31 of the drive device 30, the closing cable 51 has no risk of being exposed. Meanwhile, although the opening cable 52 is extending along the upper surface of the guide rail 20, because the upper area of the guide rail 20 is covered with the cover member 3, the opening cable 52 is not exposed.

Meanwhile, when the motor 34 rotates backward, its torque is transmitted to the rotating drum 31 through the deceleration mechanism 35 and the rotating drum 31 rotates in the other direction. When the rotating drum 31 rotates in the other direction, the rotating drum 31 takes up the opening cable 52 and lets out the closing cable 51. Consequently, as illustrated in FIG. 11, the supporting member 40 moves toward the rear, and thus the slide door SD moves to open.

In this case, the closing cable 51 moves along the lower surface of the guide rail 20, and at the curved portion of the guide rail 20, is guided by the lower guide plate 24. The opening cable 52 moves along the upper surface of the guide rail 20, and at the curved portion of the guide rail 20, is guided by the upper guide plate 23.

Then, when the supporting member 40 moving toward the rear reaches the rear end portion of the guide rail 20, the slide door SD is at a fully open position. When the slide door SD is located at the fully open position in this manner, because the guide rail 20 is covered with the slide door SD, the closing cable 51 extending along the lower surface of the guide rail 20 is not exposed.

As explained in the foregoing, in the door opening and closing apparatus according to the embodiment of the invention, because the rail module (10) is provided with the drive 30 fastened to the outside of the vehicle body 1 such that a part of the drive device 30 goes inside the vehicle body 1 through the opening P1 provided on the vehicle body 1, the installation work to the vehicle body 1 can be made easy.

In the above-described door opening and closing apparatus, because the second pulley 22 is provided on the upper portion of the rear end portion of the guide rail 20, the opening cable 52 is not exposed to the outside when the slide door SD closes the entrance 2. Consequently, mischief and the like to the opening cable 52 can be prevented, and also the appearance can be improved.

In the above-described door opening and closing apparatus, because the drive device 30 is arranged on the guide rail 20 such that the rotation axis line M of the rotating drum 31 extends substantially orthogonal to the straight line L connecting the first pulley 21 and the second pulley 22, the drive device does not need to be swung as in a conventional case, and thus the first arm portion 33a is in a position being progressively inclined downward toward the front and the second arm portion 33b is in a position being progressively inclined upward toward the rear. Consequently, the closing cable 51 can be hung on the first pulley 21 in a state of a small degree of bend and the opening cable 52 can be hung on the second pulley 22 in a state of a small degree of bend.

In the above-described door opening and closing apparatus, the opening cable 52 is hung on the second pulley 22 and coupled to the opening coupling portion 43 at the upper portion of the supporting member 40. This configuration also ensures that the opening cable 52 is not exposed to the outside when the slide door SD closes the entrance 2. Thus, mischief and the like to the opening cable 52 can be prevented, and also the appearance can be improved.

In the above-described door opening and closing apparatus, because the second pulley bracket 22b closes the upper portion of the rear end portion of the guide rail 20, the water-tightness with respect to the guide rail 20 can be improved when the rail module (10) is arranged on the vehicle body 1.

In particular, the projection 22c of the second pulley bracket 22b closing the hole P2 formed on the vehicle body 1 can yield better water-tightness.

In the above-described door opening and closing apparatus, in the drive device 30, because the outer diameter of the rotating drum 31 is made smaller than the maximum diameter of the deceleration mechanism 35, if the lengths of the opening cable 52 and the closing cable 51 are the same as those of the conventional case, the number of wounds of the opening cable 52 and the closing cable 51 increases and the length of the rotating drum 31 in the axis direction becomes larger as compared with the conventional case. However, by making the outer diameter of the rotating drum 31 smaller than the maximum diameter of the deceleration mechanism 35, the opening P1 of the vehicle body 1 that the drive device 30 passes through when the rail module (10) is arranged on the vehicle body 1 can be made small, and thus the opening P1 can be prevented from being increased in size.

In particular, by making the outer diameter of the rotating drum 31 smaller than the maximum diameter of the deceleration mechanism 35, the output of the cables (the closing cable 51 and the opening cable 52) that is calculated by "motor output torque/outer diameter of rotating drum" can be increased. Consequently, the output torque of the motor 34 can be made small when the same cable output as that of the conventional case is required, and as a result, by the reduction in power consumption, energy saving can be achieved.

In the above-described door opening and closing apparatus, the closing portion that is a portion of the housing of the drive device 30 and is located outside the vehicle body 1 closes the opening P1 by being pressed onto the vehicle body 1 by the guide rail 20 via the projecting portion 321b and being fastened in a state of being pressed onto the vehicle body 1 via the fastening bolt 71 while the sealing member 70 is interposed therein. Consequently, the opening P1 can be closed while the number of fastening members such as the fastening bolt 71 is reduced, and the better water-tightness can be yielded.

In particular, because the supporting bracket 73 that supports the driving unit 30b of the drive device 30 is fastened together onto the vehicle body 1 with the fastening bolt 71, the reduction in fastening process to fasten the driving unit 30b can be achieved, and also the reduction in the number of fastening members can be achieved.

In the above-described door opening and closing apparatus, because the opening coupling portion 43 is arranged on the supporting member 40 in a form of being able to swing about the shaft center of the shaft 432, the opening coupling portion 43 can swing as appropriate when the supporting member 40 moves on the guide rail 20 in which the curved portion is formed halfway. Consequently, the opening cable 52 can be prevented from being damaged by a twist and the like.

Figure 12:
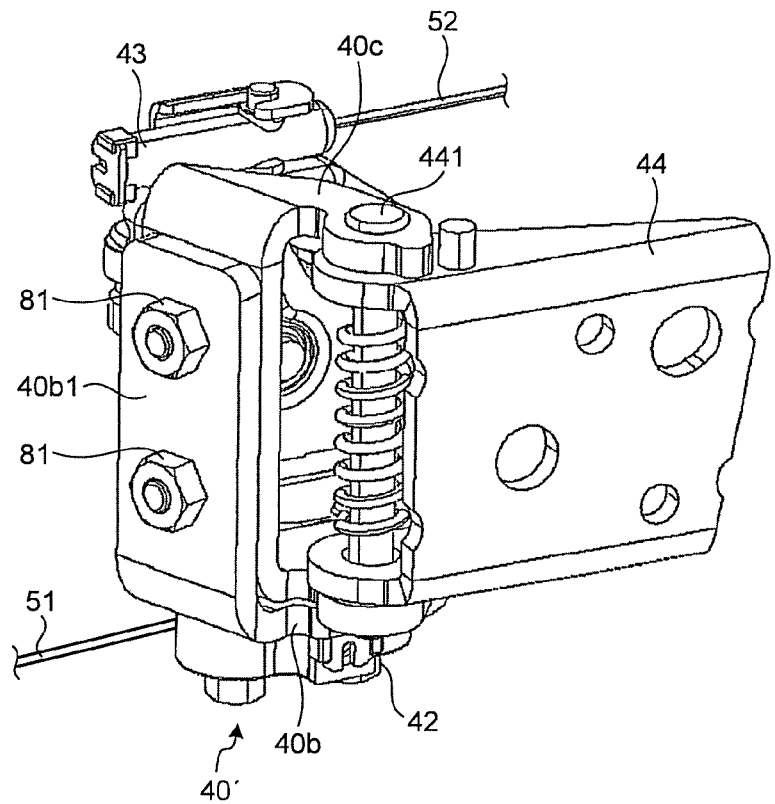
FIG. 12 is a perspective view illustrating a modification of a supporting member of the door opening and closing apparatus according to the embodiment of the invention.
Figure 13:
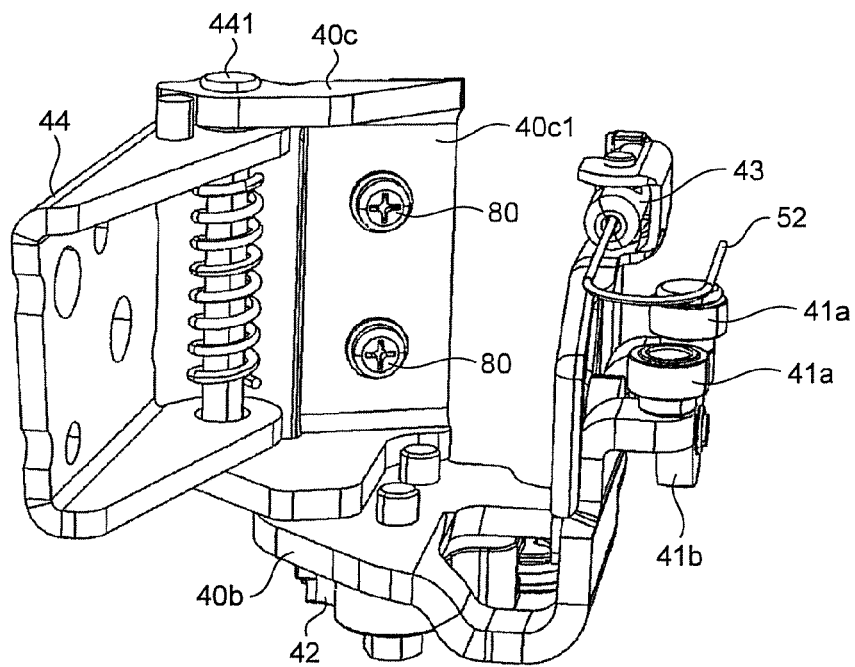
FIG. 13 is a perspective view illustrating the modification of the supporting member of the door opening and closing apparatus according to the embodiment of the invention.

FIGS. 12 and 13 are perspective views illustrating a modification of the supporting member of the door opening and closing apparatus according to the embodiment of the invention. Note that ones having the same configuration as the above-described supporting member 40 are given the same reference signs, and redundant explanations are omitted. A supporting member 40' exemplified here includes a first support base portion 40b and a second support base portion 40c.

The first support base portion 40b includes the roller 41a that is rotatable around the vertical axis and the roller 41b that is rotatable around the horizontal axis, and is movable along the extending direction of the guide rail 20 by the rollers 41a and 41b rolling along the inside of the guide rail 20. On such a first support base portion 40b, the closing coupling portion 42 and the opening coupling portion 43 are provided, other than the above-described rollers 41a and 41b.

On the first support base portion 40b, a fastening piece 40b1 is further provided. The fastening piece 40b1 is a portion in a flat plate shape formed in a form of extending upward from the front end portion of the first support base portion 40b. The fastening piece 40b1 is provided standing along a direction substantially orthogonal to the extending direction of the guide rail 20.

The second support base portion 40c is provided with the mounting member 44. The mounting member 44 is arranged on the second support base portion 40c to be rotatable about the shaft center of the shaft 441 extending along the up-and-down direction, and is the one that the slide door SD (see FIGS. 1 and 14) is mounted thereon.

The second support base portion 40c includes a fastening portion 40c1. The fastening portion 40c1 is a portion in a flat plate shape extending along the up-and-down direction and a rear side of the fastening portion 40c1 is exposed. Such a second support base portion 40c is attached to the first support base portion 40b to be fasteners in a form that the fastening portion 40c1 overlaps the fastening piece 40b1 of the first support base portion 40b. Explaining more specifically, the second support base portion 40c is attached to the first support base portion 40b by screwing fastening bolts 80, which are inserted into fastening holes 40b2 and others formed on the fastening portion 40c1 and the fastening piece 40b1, to fastening nuts 81, in a state that the fastening portion 40c1 is overlapping the fastening piece 40b1.

Because the supporting member 40' is thus provided with the first support base portion 40b and the second support base portion 40c, the slide door SD can be supported in the following manner.

Figure 14:
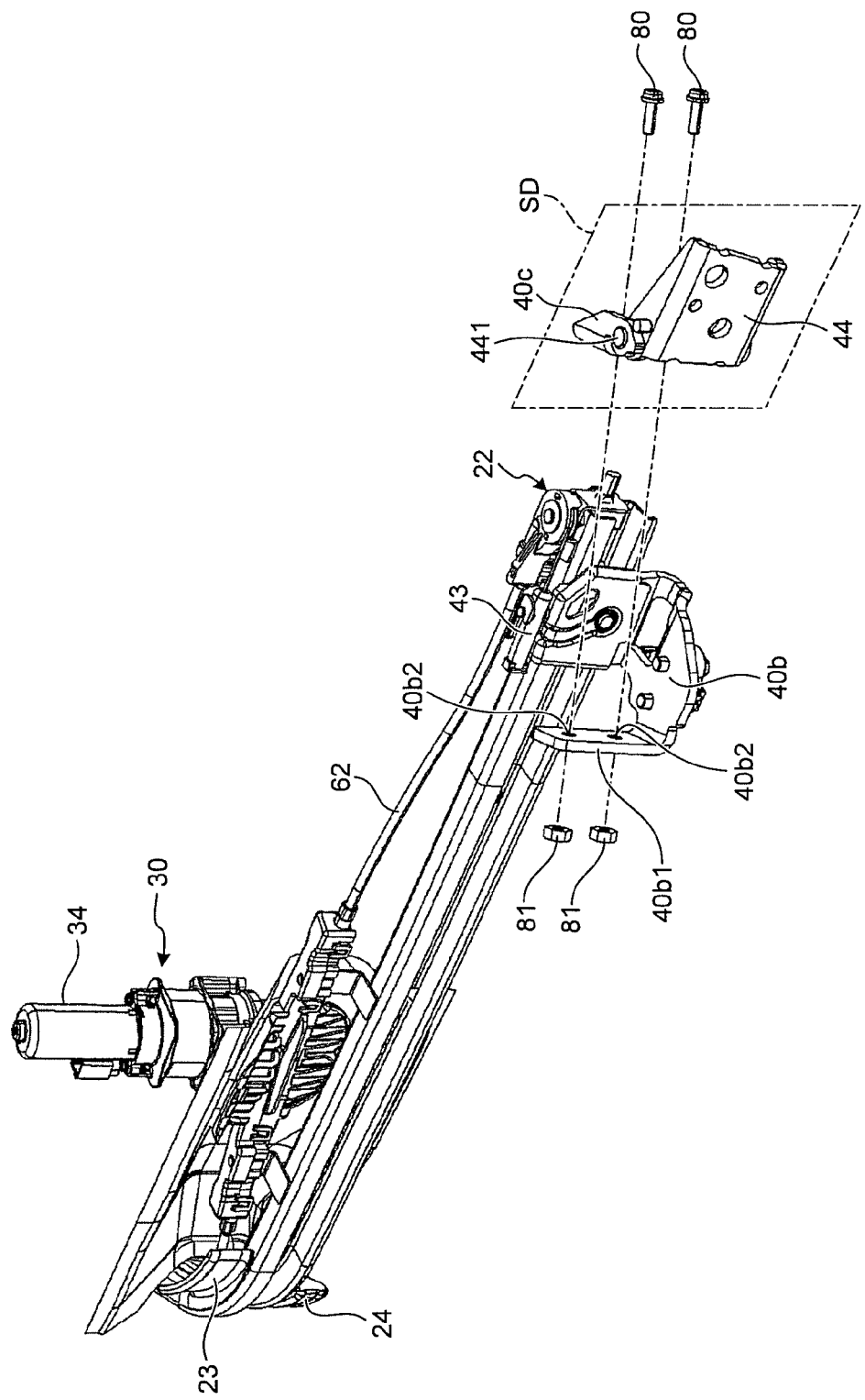
FIG. 14 is an exploded perspective view of the supporting member illustrated in FIGS. 12 and 13.

As illustrated in FIG. 14, the first support base portion 40b is moved to the rear end portion of the guide rail 20, which has already been arranged on the mounting panel P (vehicle body 1). Then, the second support base portion 40c for which the slide door SD has already been mounted is arranged such that the fastening portion 40c1 overlaps the fastening piece 40b1. In this case, the upper supporting portion and the lower supporting portion mounted on the slide door SD have already been inserted to the upper rail 4 and the lower rail 5, respectively, of the vehicle body 1.

Figure 15:
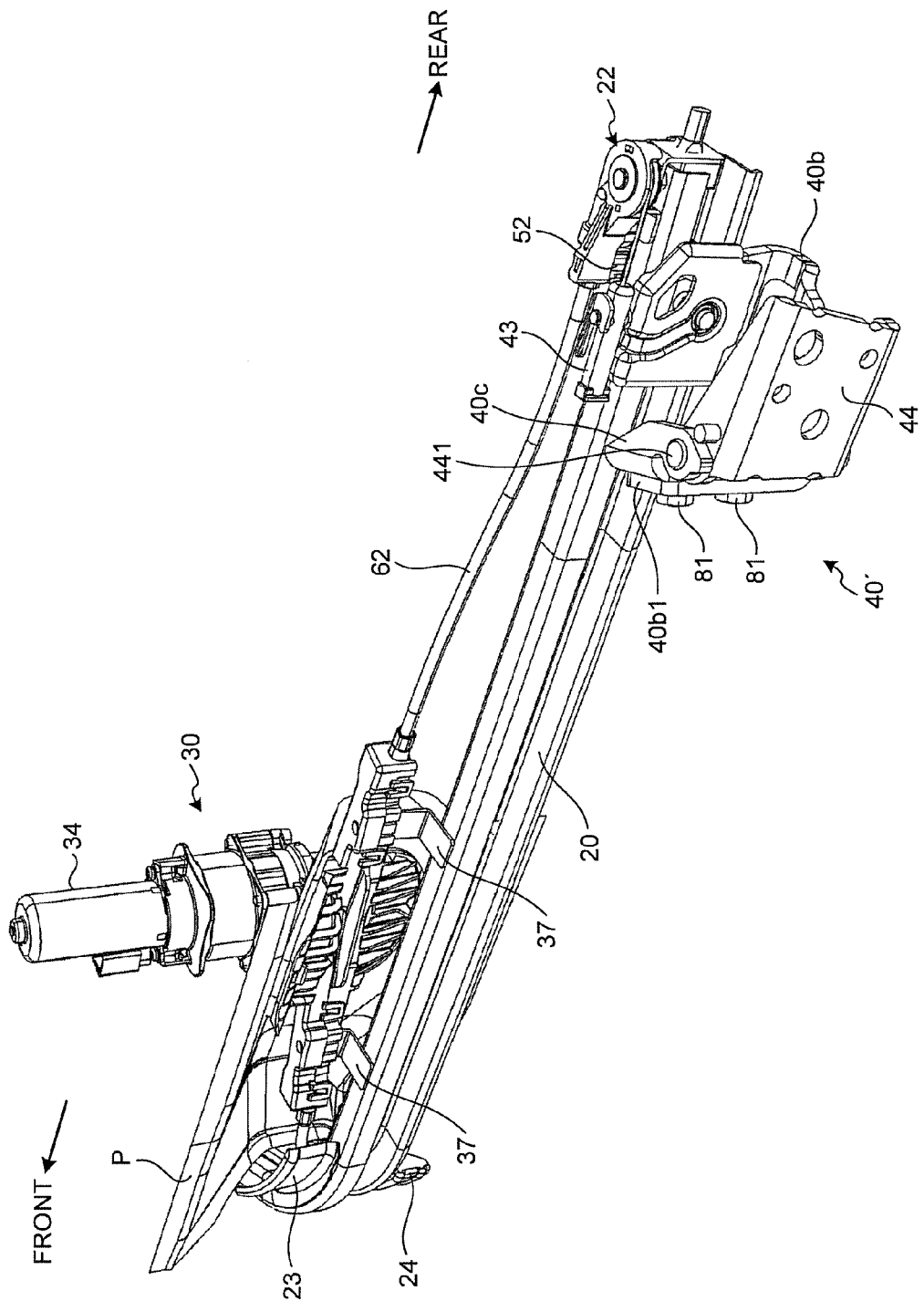
FIG. 15 is a perspective view of a left-side rail module to which the supporting member illustrated in FIGS. 12 and 13 has been applied.
Figure 16:
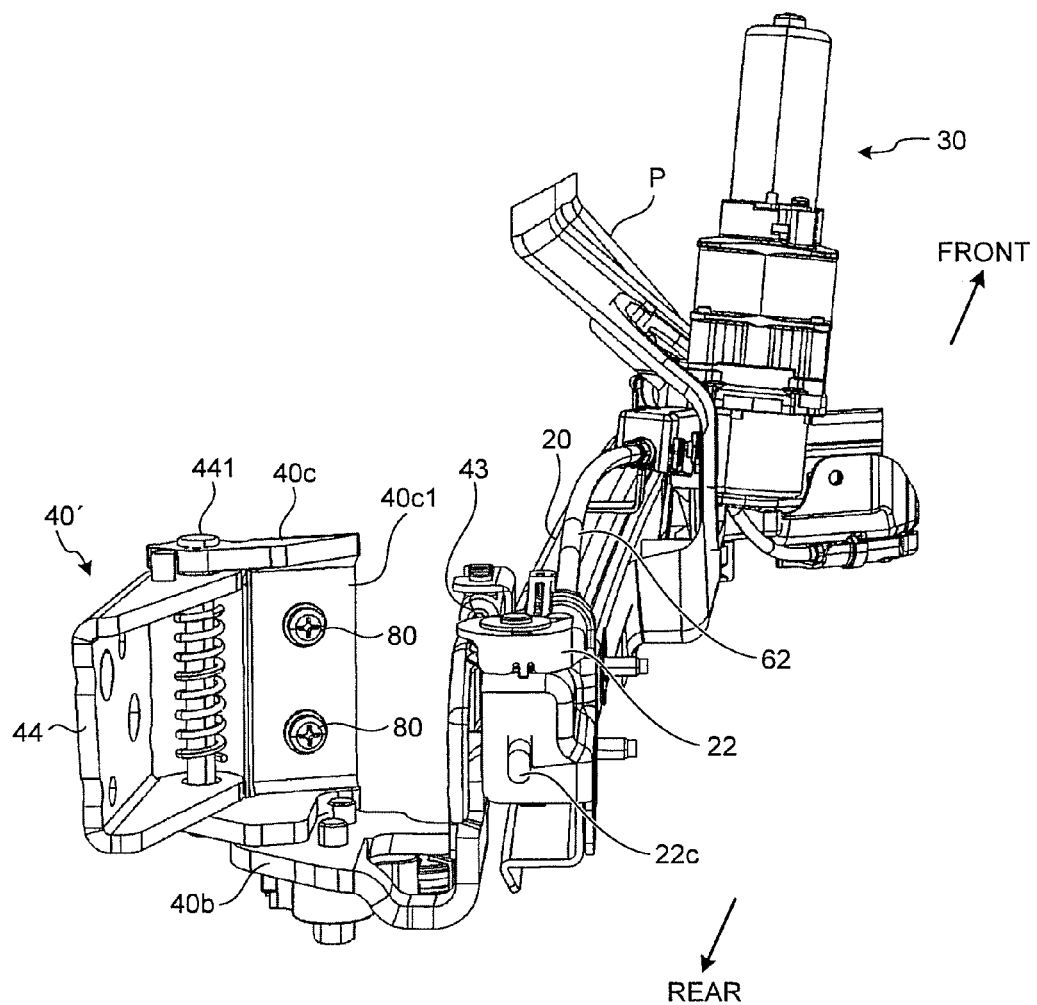
FIG. 16 is a perspective view of the left-side rail module to which the supporting member illustrated in FIGS. 12 and 13 has been applied.

Then, as illustrated in FIGS. 15 and 16, by aligning fastening holes, not depicted, of the fastening portion 40c1 with the fastening holes 40b2 of the fastening piece 40b1, inserting the fastening bolts 80 from the rear side, and screwing the fastening bolts 80 to the fastening nuts 81, the second support base portion 40c is attached to the first support base portion 40b. This makes the supporting member 40' support the slide door SD.

In the door opening and closing apparatus thus configured, the fastening piece 40b1 of the first support base portion 40b is provided standing along the direction substantially orthogonal to the extending direction of the guide rail 20 and the rear side of the fastening portion 40c1 of the second support base portion 40c is exposed. Thus, in a state that the first support base portion 40b is located at the rear end portion of the guide rail 20, the slide door SD can be supported easily by inserting the fastening bolts 80 from the rear side and attaching the second support base portion 40c to the first support base portion 40b. Consequently, the mounting of the slide door SD can be made easy, and as a result, the installation work to the vehicle body 1 can be made easy.

As in the foregoing, the preferred embodiment of the present invention has been explained in detail. The invention, however, is not limited to this and various modifications can be made.

In the above-described embodiment, the second pulley 22 that is an opening inversion member is arranged on the upper end portion of the guide rail 20 and the first pulley 21 that is a closing inversion member is arranged on the lower end portion of the guide rail 20. However, in the invention, the closing inversion member may also be arranged on the upper end portion of the rail member.

In the above-described embodiment, the rail module (10) is mounted to the vehicle body 1 in a state that the drive device 30 has been assembled. In the invention, however, the driving unit 30b of the drive device 30 may be fastened to the vehicle body 1 after being separated from the driven unit 30a, and afterward, the driving unit 30b may be attached to a part of the driven unit 30a that passes through the opening P1 of the vehicle body 1 and goes inside the vehicle body 1. With this configuration, the opening P1 of the vehicle body 1 can be further downsized.

REFERENCE SIGNS LIST 1 vehicle body
10 left-side rail module
20 guide rail (rail member)
21 first pulley (closing inversion member)
21b first pulley bracket
22 second pulley (opening inversion member)
22b second pulley bracket 22c projection
30 drive device
30a driven unit
30b driving unit (drive unit)
31 rotating drum
32 casing
32a casing body portion
32b casing outlet portion
321 case drum
321a first closing plate portion
321b projecting portion
322 cover drum
322a second closing plate portion
34 motor
35 deceleration mechanism
40 supporting member
42 closing coupling portion
43 opening coupling portion
44 mounting member
51 closing cable
52 opening cable
70 sealing member
71 fastening bolt
73 supporting bracket
P mounting panel
P1 opening
P2 hole
SD slide door

The invention claimed is:

1. A door opening and closing apparatus comprising a rail module including:
   a rail member extending along a front-and-rear direction and including;
      a closing inversion member provided on a first end portion of the rail member; and
      an opening inversion member provided on a second end portion of the rail member;
   a drive device mounted on the rail member; and
   a supporting member coupled to:
      a first end portion of a closing cable, a second end portion of the closing cable being connected to the drive device, the closing cable being hung on the closing inversion member; and
      a first end portion of an opening cable, a second end portion of the opening cable being connected to the drive device, the opening cable being hung on the opening inversion member, the supporting member being configured to move along an extending direction of the rail member by a driving force given by the drive device, the door opening and closing apparatus moving a door to open and close with movement of the supporting member by making the supporting member support the door, wherein
   the rail member of the rail module fastened to an outside surface of the vehicle body,
   a part of the drive device is arranged inside the vehicle body through an opening provided on the vehicle body,
   the door opening and closing apparatus includes;
      a sealing member; and
      a fastening member,
   the drive device includes a housing,
   a portion of the housing is configured to form a part of the outside surface of the vehicle body to close the opening via the sealing member, and
   the portion of the housing is pressed onto the vehicle body by the rail member and fastened to the vehicle body with the fastening member.

2. The door opening and closing apparatus according to claim 1, further comprising;
   a supporting bracket supporting a drive unit of the drive device,
   wherein the supporting bracket is fastened to the vehicle body with the fastening member.

3. The door opening and closing apparatus according to claim 1, wherein the sealing member is arranged on the vehicle body in vicinity to the opening.

* * * * *